Feb. 8, 1944.  D. McLACHLAN, JR  2,341,108
X-RAY TECHNIQUE
Filed March 5, 1942    2 Sheets-Sheet 1
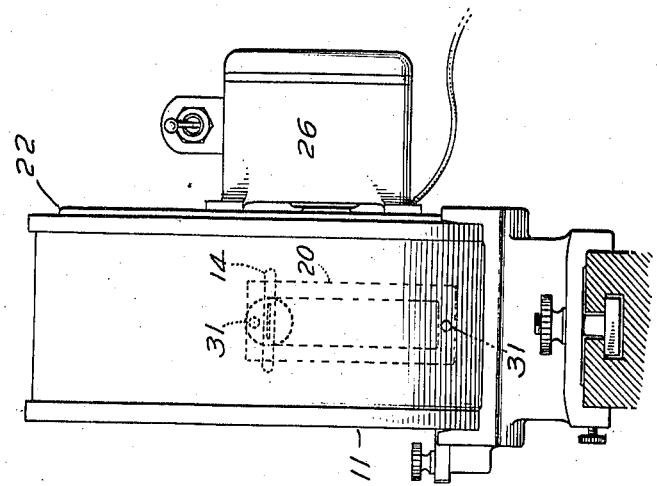
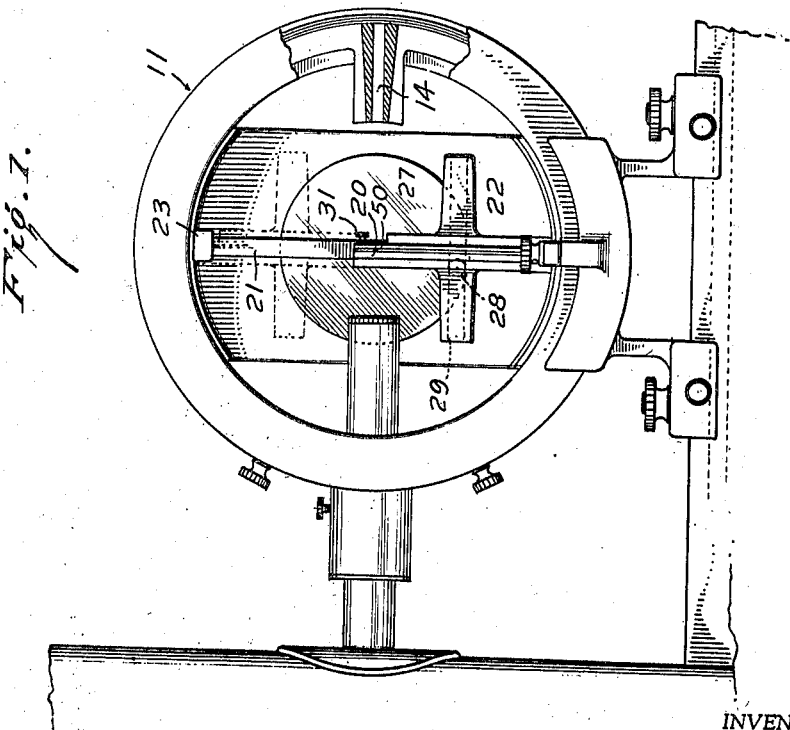
INVENTOR
DAN McLACHLAN, JR.,
BY Frank J. Novotny
ATTORNEY.

Feb. 8, 1944.  D. McLACHLAN, JR  2,341,108
X-RAY TECHNIQUE
Filed March 5, 1942  2 Sheets-Sheet 2
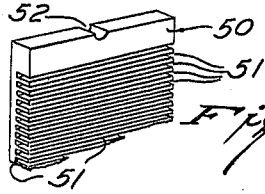
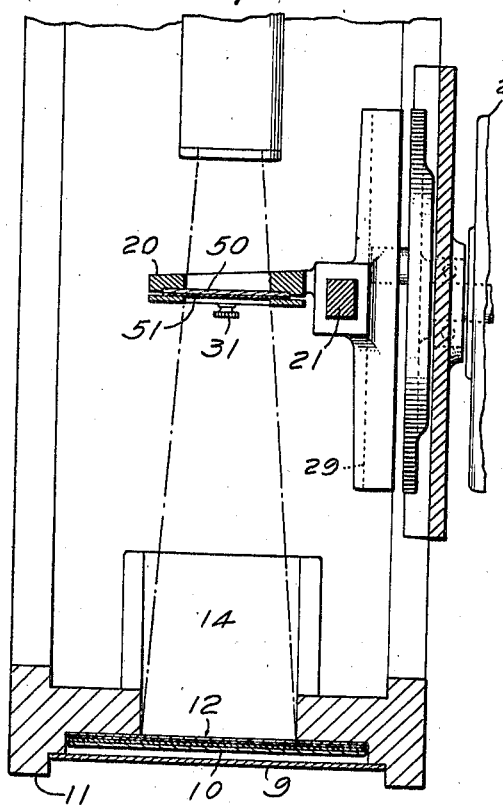
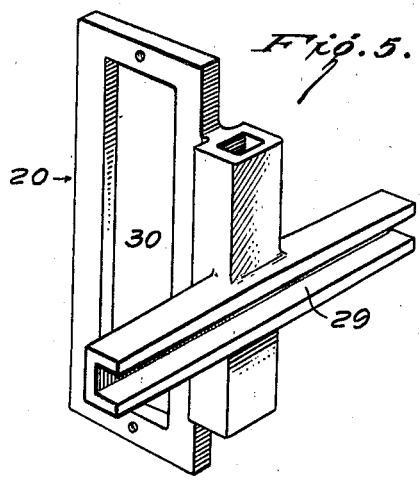
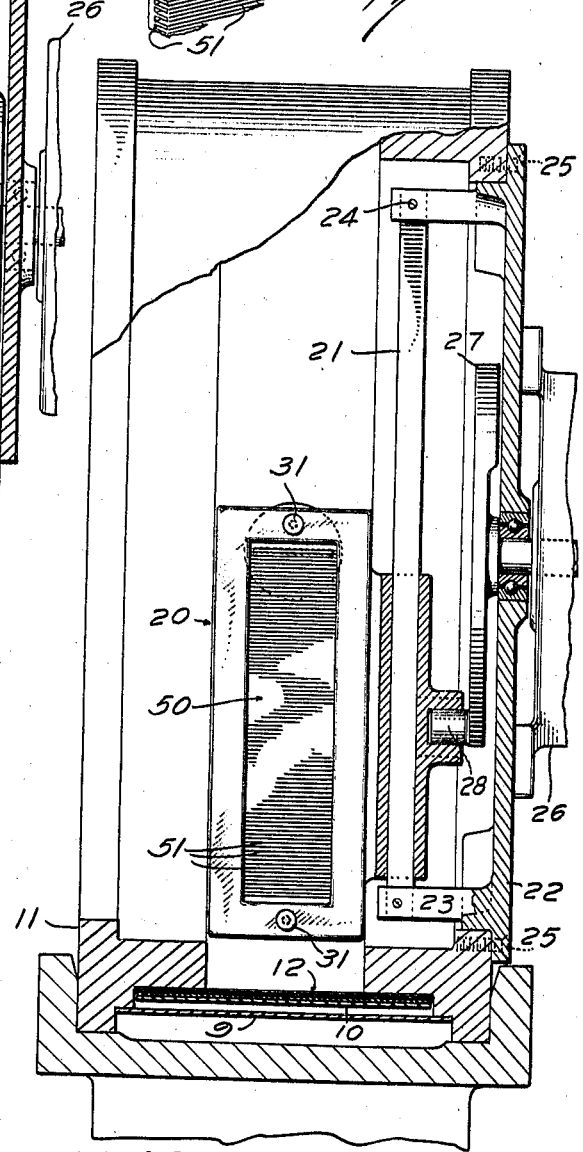
INVENTOR.
DAN McLACHLAN, JR.,
BY Frank J. Novotny
ATTORNEY.

Patented Feb. 8, 1944

2,341,108

UNITED STATES PATENT OFFICE 2,341,108

X-RAY TECHNIQUE

Dan McLachlan, Jr., Old Greenwich, Conn., assignor to American Cyanamid Company, New York, N. Y., a corporation of Maine Application March 5, 1942, Serial No. 433,427

3 Claims. (Cl. 250—53)

This invention relates to an improved camera for use in the X-ray analysis of powdered materials, crystalline substances, and the like. More particularly, it embraces an auxiliary apparatus which when attached to a conventional X-ray camera set up for standard Hull-Debye-Scherrer powder analyses, is adapted to pass or reciprocate crystalline specimens continuously through the path of the incident X-ray beam normally used in such a camera.

Heretofore, in order to obtain satisfactory X-ray photographs in accordance with the standard Hull-Debye-Scherrer technique of X-ray analysis for powdered materials, it was necessary to grind the material to 200 mesh or smaller. In use, such a camera includes an incident primary X-ray beam which passes through the powder specimen, is diffracted and falls upon a photographic film as a series of successive lines each uniformly intense throughout and each corresponding to one interplanar distance, familiar to those versed in X-ray technique.

However, some substances, and more particularly organic crystalline materials, do not lead themselves to such fine grinding as 200-mesh. For example, sulfanilamide when ground to approximately such size does not remain as a perfectly ordered crystalline material, but is distorted as a result of the grinding process. This results in the obtainment of X-ray photographs which are not replicas of those reproduced from the crystaline material in its unground or natural state. However, when such organic crystalline material is left in a relatively coarser crystalline state and its diffraction pattern obtained while held in a single capillary tube, a spotty photograph or one displaying discontinuous lines is usually obtained. This is due to the relatively small number of crystals lying in the scope of the beam. Such a photograph is not capable of yielding the necessary intensity and distance measurements with such accuracy as is now demanded in industrial and scientific research.

It is an object of this invention to render unnecessary the fine grinding, with its accompanying distortion, of crystalline materials for use in X-ray analysis while nevertheless facilitating the obtainment of powder diffraction patterns wherein the lines are fine, continuous and of even intensity throughout their length. Still other and further objects will become apparent upon reading the following description of one embodiment of this invention. It is to be understood that the example herein given in considerable detail is merely illustrative and not limitative of this invention.

In general this invention attains the above and other objects by providing apparatus wherein a plurality of capillary compartments or similarly elongated sample holders filled with a comminuted specimen are passed through the collimated X-ray beam of a Hull-Debye-Scherrer type of powder camera to obtain a series of superimposed X-ray pictures which are recorded on a single film in the form of continuous line spectra of even intensity throughout.

In order to facilitate a more complete understanding of the principles of this invention, a number of drawings forming a part of this disclosure are included herein and illustrate clearly a specific embodiment of the invention. The scope of the invention, however, is to be limited solely by the appended claims. In the drawings:

Fig. 1 is a side view of one modification of the apparatus of this invention shown fitted to the quadrant cassette of a conventional type of Hull-Debye-Scherrer camera;

Fig. 2 is a front view of the apparatus of Fig. 1;

Fig. 3 is an enlarged view of the apparatus of Fig. 2 with a portion of the cassette broken away to show the details of the reciprocating mechanism more clearly;

Fig. 4 is an enlarged sectional view taken on a horizontal diameter of the cassette of Fig. 1;

Fig. 5 is a perspective view of one type of reciprocating sample mount, and

Fig. 6 is a perspective view of a sample frame 50 having grooves 51 for carrying the crystal specimens.

Referring now in more detail to the drawings, the cylindrical cassette 11 has wrapped thereon a photographic film 12. This film is in the form of a narrow strip and hence is used to record a desired portion of the X-ray beam and its diffracted beam or beams, namely, those falling on or within the cylindrical surface. Any laterally diffracted X-rays are lost and left unregistered. As shown more clearly in Figs. 3 and 4, film 12 consists, preferably of three layers, namely, an inner sheet of aluminum foil .001 inch thick to keep out ordinary light while admitting X-rays, the film itself, and an outer fluorescent screen backing to render the film more sensitive. A spring brass collar 10 holds the film unit 12 in place on the cassette while cover ring 9 completes the assembly of the film on the cassette.

The conventional collimater adapted to align the incident X-ray beam contains a slit system which is used to define the emerging X-rays in the form of a thin flat beam which strikes a sample cluster of crystals introduced into its path at the axis of the cassette. The zero or undiffracted beam enters the zero beam trap opening 14 while the diffracted beams strike the film where they are recorded. A removable plug may be inserted in the zero beam trap opening in order to block out the position of the zero beam from the film. Momentarily removing the plug during an exposure is sufficient to record the position of the zero beam on the film.

The novel features of the particular embodiment of the apparatus illustrated comprise the reciprocating sample mount 20 which in the particular embodiment shown is capable of being transpositioned upward and downward on the square guide rod 21. Guide rod 21 is affixed to lugs 23 by means of screws 24. Lugs 23 are a part of the auxiliary frame 22 which is rigidly affixed to the cassette 11 by screws 25. The electric motor 26, through cam 27 and roller 28 actuates the sample mount 20 through slotted bar 29. This reciprocates the sample mount 20 up and down so that the incident X-ray beam can play across the entire opening 30 in which a number of capillary tubes, sample holders, or the like filled with comminuted material are positioned.

The sample holder itself is affixed to the sample mount 20 by means of thumbscrews 31. The sample holder may take any one of a number of shapes and may be made up of any one of a number of materials such as resins, metals, glass, and the like, each being adapted to hold either on its surface or in grooves cut therein a pre-determined quantity of the crystalline material or clusters of the crystalline material in the form of elongated samples of relatively coarse crystalline powder. With this apparatus the samples are ordinarily placed into and removed from the path of the flat incident beam of X-rays and as a result clear cut continuous line spectra of even intensity throughout are obtained.

Numerous other devices for moving the crystalline samples across the path of the incident X-ray beam of a Hull-Debye-Scherrer camera will, of course, readily suggest themselves to those skilled in the art upon reading the above disclosure. Thus a revolving disc having grooves cut radially in its surface or any similarly continuously moving sample mount may be used to cause a great number of crystal samples to pass through the path of the incident X-ray beam. Likewise means may be provided for causing crystalline material to fall freely through the X-ray beam, being collected at a lower position and returned to again continuously fall through the incident beam. Such apparatus and similar and equivalent apparatus is intended to be encompassed within the scope of the appended claims.

I claim:

1. An X-ray apparatus for obtaining powder diffraction patterns comprising an incident collimated X-ray beam, a sample mount, grooves in the sample mount cut in the form of individual adjacent teeth adapted to hold comminuted crystalline material in the grooves between the adjacent teeth, means for continuously moving the sample mount in the path of the incident X-ray beam whereby the beam passes through the crystalline material held in the grooves and is diffracted by individual crystals, a guide rod whereon the sample mount is capable of reciprocating, said means for moving the sample mount comprising a transversely cut groove in the sample mount, a cam for actuating the sample mount by slidably moving in the last mentioned groove, and driving means for rotating the cam, and means comprising a photographic film for recording the diffracted incident beam after its passage through the crystalline material.

2. An X-ray apparatus in accordance with claim 1 wherein a monochromatic X-ray beam is utilized.

3. An X-ray apparatus for obtaining powder diffraction patterns comprising an incident collimated X-ray beam, a sample mount, grooves in the sample mount cut in the form of individual adjacent teeth adapted to hold comminuted crystalline material in the grooves between the adjacent teeth, means for moving the sample mount in the path of the incident X-ray beam whereby the beam passes through the crystalline material held in the grooves and is diffracted by individual crystals, a guide rod whereon the sample mount is capable of sliding motion in translation, said means for moving the sample mount comprising a transversely cut groove in the sample mount, a cam for actuating the sample mount by slidably moving in the last mentioned groove, and driving means for rotating the cam, and means comprising a photographic film for recording the diffracted incident beam after its passage through the crystalline material.

DAN McLACHLAN, Jr.